T. WILLI.
MECHANICAL MOVEMENT.
APPLICATION FILED MAR. 28, 1910.
959,826.
Patented May 31, 1910.
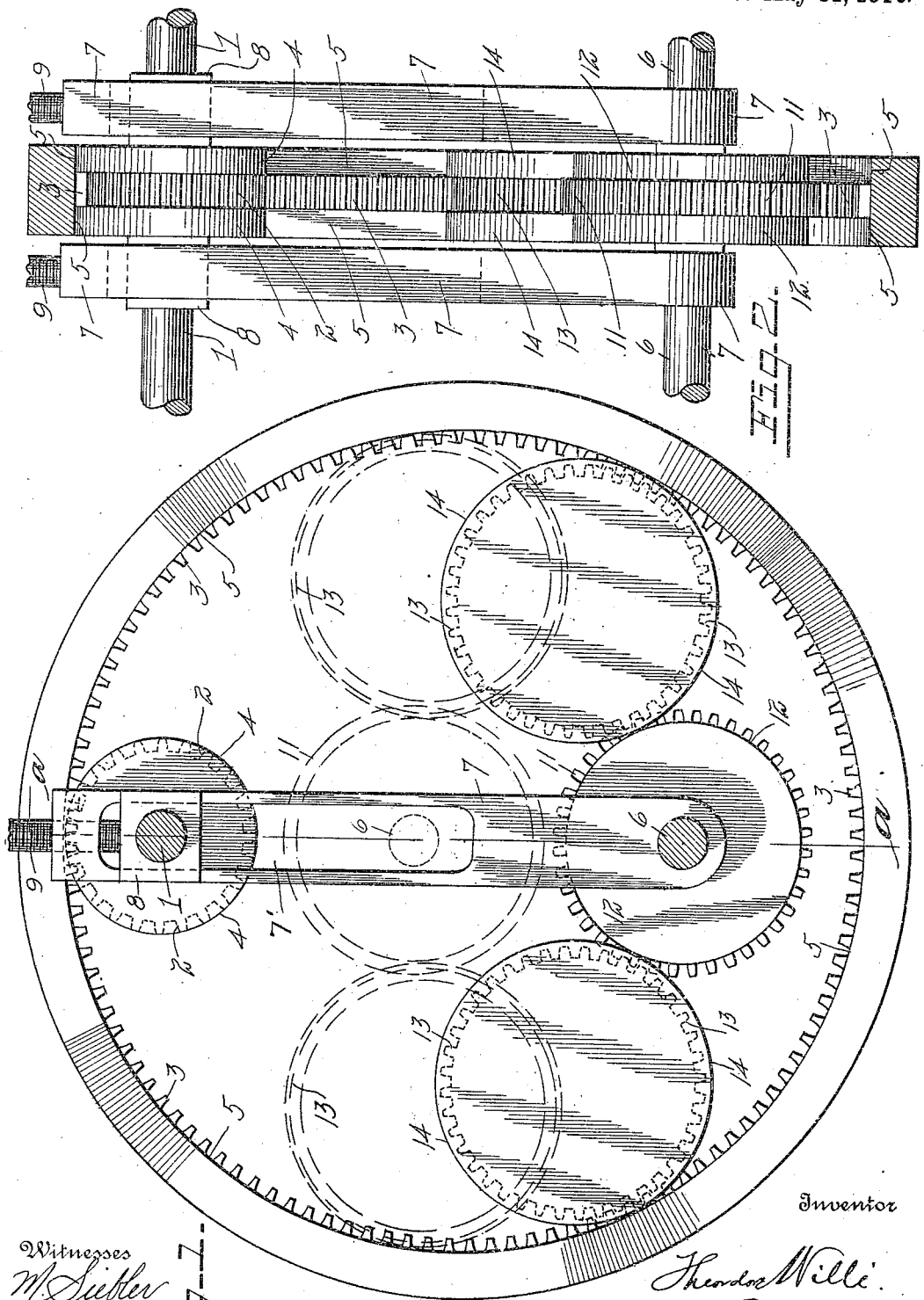

UNITED STATES PATENT OFFICE.

THEODORE WILLI, OF DAYTON, OHIO, ASSIGNOR OF ONE-HALF TO EDWARD G. PEASE, OF DAYTON, OHIO.

MECHANICAL MOVEMENT.

959,826.      Specification of Letters Patent.      Patented May 31, 1910.

Application filed March 28, 1910. Serial No. 551,903.

*To all whom it may concern:*

Be it known that I, THEODORE WILLI, a citizen of the United States, residing at Dayton, in the county of Montgomery and State of Ohio, have invented certain new and useful Improvements in Mechanical Movements; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in mechanical movements.

The object of the invention is to provide a device of the above type in which two shafts may be driven, one from the other, and at the same time the distance between the two shafts may be adjusted or varied.

In the accompanying drawings Figure 1 is a side elevation of the device and Fig. 2 is a sectional view on the line *a—a* of Fig. 1.

In the drawings 1 represents a shaft, which may be termed the driving shaft, and upon which is mounted a shrouded pinion 2. The pinion 2 is in mesh with an internal gear 3, and the shrouds 4 of said pinion ride against surfaces 5—5 of the internal gear 3. It will be seen that the shrouds 4 hold the pinion 2 in mesh with the internal gear 3. Mounted below the driving shaft 1 is a shaft 6, which may be termed the driven shaft, and which may be supported from the driving shaft in different ways. In the drawings it is shown supported by means of adjustable hangers 7. The said hangers 7 are provided with longitudinal slots 7' in which slide blocks 8 journaled on the driving shaft 1 and constituting the bearings therefor. Adjusting screws 9 control the position of the bearings 8 in said slots and therefore the position of the driven shaft 6, as it will be seen from the drawings. Mounted on the driven shaft 6 is a pinion 11 provided with side disks 12 and in mesh with shrouded gears 13 on each side, and which are in mesh with the internal gear 3. The internal gear 3 constitutes a ring which incloses the aforesaid gearing and within which the said gearing may be shifted to a variety of positions depending upon the distance in which the driven shaft 6 is moved from the center.

The shrouds 14 of the gears 13 ride against the peripheries of the disks 12 of the pinion 11 and also against the internal surfaces 5 which lie on each side of the internal gear 3. The gears 13 are held in position by the shrouds 14 engaging the internal gear 3 and the teeth of the pinion 11.

It will be seen that when the pinion 2 is rotated, the pinion 11 will also be rotated through the internal gear 3, which is driven from said pinion 2. If the pinion 11 is raised or lowered away from the center of the gear 3, it will still be driven by said internal gear 3 as the gears 13 are always in mesh with the internal gear 3 and the pinion 11. It is also clear that the gears 3, 13 and 11 may be driven by friction in which case the gear teeth would be dispensed with and the shrouds 14 would inclose friction surfaces instead of the teeth 13 and the teeth 3 of the main gear would be a continuous friction surface overlapped on each side by the shrouds 14, which shrouds would also overlap friction surfaces on the wheel 12 instead of the teeth 11.

Without limiting myself to the precise arrangement shown and described, I claim:

1. In a mechanical movement, a rotatable ring and means for driving said ring, of a shiftable pinion driven by said ring and around which the ring rotates, means for shifting said pinion to and from the axis of the ring, and idlers interposed between opposite sides of the shiftable pinion and the inner periphery of the ring and through which the shiftable pinion is driven from said ring.

2. In a mechanical movement, the combination with an internal gear, and means for driving the same, of a shiftable pinion mounted within the circumference of said gear, means for shifting the position of said pinion to and from the center of the ring, and idlers interposed between opposite sides of said shiftable pinion and the inner circumference of the ring and through which the shiftable pinion is driven from said ring.

3. In a mechanical movement, the combination with an internal gear, and means for driving said gear, of a shiftable pinion mounted within the circumference of said internal gear, and shrouded gears in mesh with said internal gear and said pinion, the shrouds of said gears engaging the teeth of the internal gear and of the pinion to hold said gears and pinion in mesh.

4. In a mechanical movement, the combination with an internal gear having smooth annular internal surfaces on each side of the teeth thereof, a shrouded driving gear in mesh with said internal gear, the peripheries of the shrouded portions of said driving gear being in engagement with the smooth annular surfaces of the internal gear, a shiftable pinion provided with side disks and mounted within the circumference of said internal gear, shrouded gears interposed between opposite sides of said shiftable pinion and the internal gear, the shrouds of said shrouded gears being in engagement with the smooth annular surfaces of the internal gear, and with the peripheries of the disks of the shiftable pinion, and means for supporting and shifting the shiftable pinion.

In testimony whereof I affix my signature, in presence of two witnesses.

THEODORE WILLI.

Witnesses:
R. J. McCarty,
Matthew Seibler.